(12) United States Patent
Lee et al.

(10) Patent No.: US 7,343,666 B2
(45) Date of Patent: Mar. 18, 2008

(54) METHODS OF MAKING MAGNETIC WRITE HEADS WITH USE OF LINEWIDTH SHRINKAGE TECHNIQUES

(75) Inventors: Kim Y. Lee, Fremont, CA (US); Jyh-Shuey Jerry Lo, San Jose, CA (US); Dennis Richard McKean, Milpitas, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 574 days.

(21) Appl. No.: 10/881,782

(22) Filed: Jun. 30, 2004

(65) Prior Publication Data

US 2006/0010684 A1    Jan. 19, 2006

(51) Int. Cl.
G11B 5/127    (2006.01)
H04R 31/00    (2006.01)

(52) U.S. Cl. ............... 29/603.16; 29/603.13; 29/603.15; 29/603.18; 75/414; 216/62; 216/66; 216/67; 360/122; 360/126; 360/317; 451/5; 451/41

(58) Field of Classification Search ............. 29/603.07, 29/603.13–603.16, 603.18; 75/414; 205/119, 205/122; 216/62, 66, 67; 360/121, 122, 360/123, 126, 317; 451/5, 41; 427/127, 427/128

See application file for complete search history.

(56) References Cited

U.S. PATENT DOCUMENTS

| 5,096,802 | A | 3/1992 | Hu |
| 5,652,687 | A * | 7/1997 | Chen et al. ........... 360/126 |
| 5,802,700 | A * | 9/1998 | Chen et al. ........... 29/603.14 |
| 5,976,769 | A | 11/1999 | Chapman |
| 6,117,622 | A | 9/2000 | Eisele et al. |
| 6,187,486 | B1 | 2/2001 | Lai et al. |
| 6,503,693 | B1 | 1/2003 | Mohondro et al. |
| 6,511,794 | B1 | 1/2003 | Furukawa |
| 6,566,041 | B2 | 5/2003 | Iwasaki et al. |
| 2001/0007732 | A1 | 7/2001 | Iwasaki et al. |
| 2003/0104290 | A1 | 6/2003 | Iwasaki et al. |
| 2003/0143489 | A1 | 7/2003 | Kong et al. |

FOREIGN PATENT DOCUMENTS

| JP | 6148661 A | 5/1994 |
| JP | 11039618 A * | 2/1999 |

* cited by examiner

Primary Examiner—Paul D. Kim
(74) Attorney, Agent, or Firm—John J. Oskorep, Esq.; Rambod Nader

(57) ABSTRACT

In one illustrative example, a method for use in making a magnetic write head includes the steps of forming a first pole piece layer of a first pole piece; forming a patterned resist over the first pole piece layer; electroplating a pedestal over the first pole piece layer within a channel of the patterned resist; electroplating a metal gap layer over the pedestal within the channel of the patterned resist; forming a resist channel shrinking film over the patterned resist; baking the resist channel shrinking film over the patterned to thereby reduce a width of the channel; removing the resist channel shrinking film; electroplating a second pole piece within the reduced-width channel of the patterned resist; removing the patterned resist; and milling the pedestal, using the second pole piece as a mask, to form a central notched pedestal having side walls with angled slopes.

30 Claims, 13 Drawing Sheets

PLATE GAP LAYER

FORM RESIST CHANNEL SHRINKING FILM OVER STRUCTURE

METHODS OF MAKING MAGNETIC WRITE HEADS WITH USE OF LINEWIDTH SHRINKAGE TECHNIQUES

BACKGROUND OF THE INVENTION

1. Field of the Invention

This invention relates generally to magnetic heads in disk drives, and more particularly to improved methods of making magnetic write heads with use of line width shrinkage techniques.

2. Description of the Related Art

A write head is typically combined with a magnetoresistive (MR) read head to form a merged MR head, certain elements of which are exposed at an air bearing surface (ABS). The write head comprises first and second pole pieces connected at a back gap that is recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR read head.

An MR read head includes an MR sensor sandwiched between first and second non-magnetic gap layers, and located at the ABS. The first and second gap layers and the MR sensor are sandwiched between first and second-shield layers. In a merged MR head, the second shield layer and the first pole piece are a common layer. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals.

One or more merged MR heads may be employed in a magnetic disk drive for reading and writing information on circular tracks of a rotating disk. A merged MR head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk. Flying heights are typically on the order of about 0.05 μm.

The second pole, along with its second pole tip, is frame-plated on top of the gap layer. After depositing a seed layer on the gap layer, a photoresist layer is spun on the seed layer, imaged with light, and developed to provide an opening surrounded by a resist wall for electroplating the second pole piece and second pole tip. To produce a second pole tip with a narrow track width, the photoresist layer has to be correspondingly thin.

Once the second pole tip is formed, it is desirable to notch the first pole piece opposite the first and second bottom corners of the second pole tip. Notching the first pole piece minimizes side writing in tracks written on the magnetic disk. As is known, when the tracks are overwritten by side writing the track density of the magnetic disk is reduced. When the first pole piece is notched, it has first and second side walls that are aligned with first and second side walls of the second pole tip, so that the first pole piece and the second pole tip have the same track width at the ABS. This minimizes fringing of magnetic fields from the second pole tip laterally beyond the track width (side writing) to a wide expanse of the first pole piece.

A prior art process for notching the first pole piece entails ion beam milling the gap layer and the first pole piece, employing the second pole tip as a mask. According to this prior art process as typified in U.S. Pat. Nos. 5,452,164 and 5,438,747, the gap layer is typically alumina and the first and second pole pieces and pole tips are typically Permalloy (NiFe). Alumina mills more slowly than Permalloy; thus the top of second pole tip and a top surface of the first pole piece are milled more quickly than the gap layer. Further, during ion milling there is significant redeposition of alumina on surfaces of the workpiece. The milling ion beam is typically directed at an angle with respect to a normal to the layers, in order that milling and clean-up be done subsequently or simultaneously.

Notching the first pole piece is very time consuming due, in part, to shadowing of the notch sites by the angled milling and by the profile of the second pole tip, as the wafer supporting the magnetic head is rotated. The length of milling time is due more, however, to the large lateral expanse of the first pole piece. Since the top and side walls of the second pole tip are also milled while the first pole piece is being notched, the second pole tip has to be formed with extra thickness and width so that, after notching is completed, the second pole tip is at its target height and target track width. Unfortunately, because of the long time required for notching it is difficult to meet the targets within acceptable tolerances. This lowers the manufacturing yield.

In order to minimize overmilling of the first pole piece, another process removes the gap layer—except for a desired portion between the first and second pole tips—using a wet-etchant or reactive ion mill. After the unwanted portions of the gap layer are removed, the first pole piece is ion milled employing the second pole tip as a mask. This process eliminates significant redeposition of the alumina. A problem with this process, however, is that the etching undercuts the gap layer under the base of the second pole tip, which is a critical area for the transfer of field signals. The undercut regions provide spaces where Permalloy can be redeposited during subsequent ion milling of the first pole piece, or other foreign material can be redeposited upon subsequent milling and clean-up steps. Further, if the track width of the second pole tip is in the order of 1 μm, the etchant may release the second pole tip from the gap layer, thus ruining the head.

In U.S. patent Publication No. US 2003/0179498 A1 entitled "Magnetic Head Having A Notched Pole Piece Structure And Method Of Making The Same" by Hsiao et al., an alternative method of forming a notched pole piece structure is described. This method involves ion milling a first pole piece pedestal formed over a first pole piece layer using the second pole piece as a mask so that the pedestal is formed with angled side walls. The notching is performed after the ion milling of insulator materials (alumina) which surround the pedestal. Using this method, the notching is dependent on redeposited alumina material and can be difficult to control. A patterned resist is formed for the second pole piece using photolithography and second pole piece materials are electroplated within the patterned resist. Here, the second pole piece and notched pedestal may not be properly aligned or centered, especially for narrower track-widths (e.g. less than 1 micron).

If the notched pedestal is appropriately formed and substantially symmetric, the magnetic head has suitable overwrite (OW) properties and little if any adjacent track interference (ATI) problems. If the second pole piece is not precisely centered relative the pedestal, the pedestal is formed to be asymmetric by the notching process which may undesirably cause ATI. What are needed are improved methods to make such magnetic heads so as to overcome the deficiencies of the prior art, so that the second pole piece is substantially centered over the pedestal and the pedestal is symmetrically notched.

SUMMARY

Methods of making magnetic write heads with use of line width shrinkage techniques are described herein. In one illustrative example, the method includes forming a first pole piece layer of a first pole piece; forming a patterned resist over the first pole piece layer; electroplating a pedestal over the first pole piece layer within a channel of the patterned resist; forming a gap layer within the channel of the patterned resist over the pedestal; forming a resist channel shrinking film over the patterned resist; baking the resist channel shrinking film over the patterned resist to reduce a width of the channel; removing the resist channel shrinking film; electroplating a second pole piece within the reduced-width channel of the patterned resist; removing the patterned resist; and milling the pedestal, using the second pole piece as a mask, to form a central notched pedestal having side walls with angled slopes.

Advantageously, the reduction in channel width using the resist channel shrinking film provides for self-alignment of the second pole piece with the pedestal which can be symmetrically notched for improved overwrite (OW) properties and reduced adjacent track interference (ATI).

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

Methods of making magnetic write heads with use of line width shrinkage techniques have been described. In one illustrative example, the method includes the acts of forming a first pole piece layer of a first pole piece; forming a patterned resist over the first pole piece layer; electroplating a pedestal over the first pole piece layer within a channel of the patterned resist; forming a gap layer over the pedestal within the channel of the patterned resist; forming a resist channel shrinking film over the patterned resist, baking the resist channel shrinking film over the patterned resist to reduce a width of the channel; removing the resist channel shrinking film; electroplating a second pole piece within the reduced-width channel of the patterned resist; removing the patterned resist; and milling the pedestal, using the second pole piece as a mask, to form a central notched pedestal having side walls with angled slopes.

The following description is the best embodiment presently contemplated for carrying out the present invention. This description is made for the purpose of illustrating the general principles of the present invention and is not meant to limit the inventive concepts claimed herein.

Figure 1:
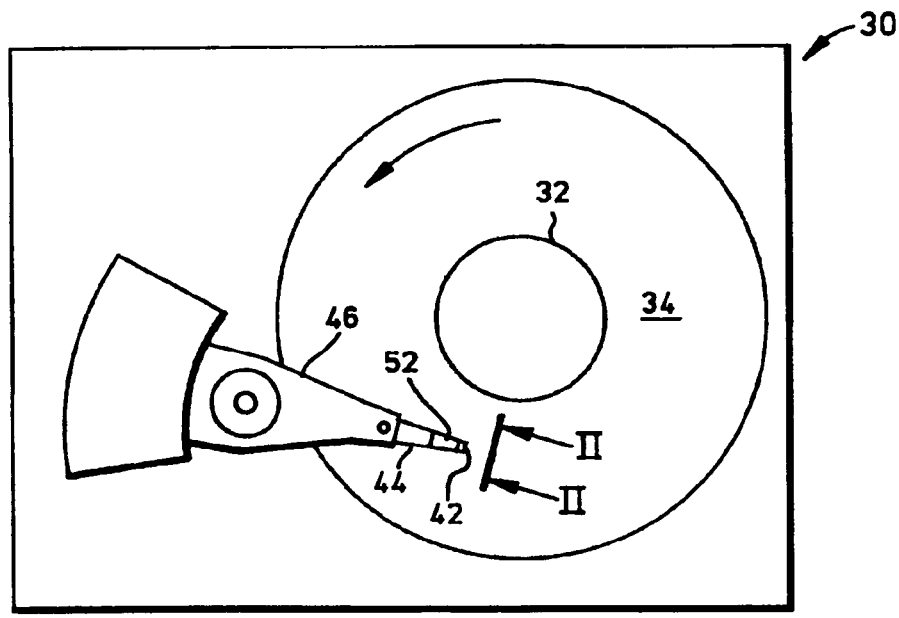
FIG. 1 is a planar view of an exemplary magnetic disk drive.
Figure 2:
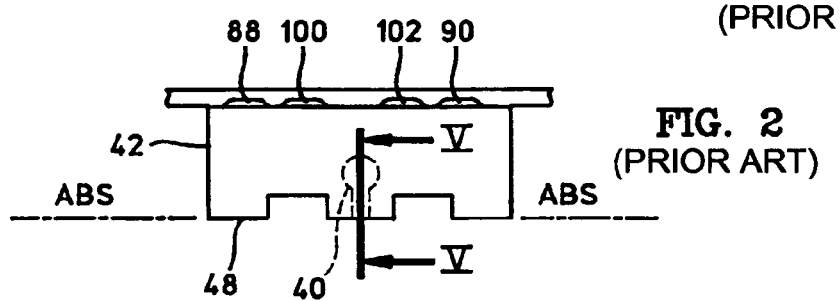
FIG. 2 is an end view of a slider with a magnetic head of the disk drive as seen in plane II-II.
Figure 3:
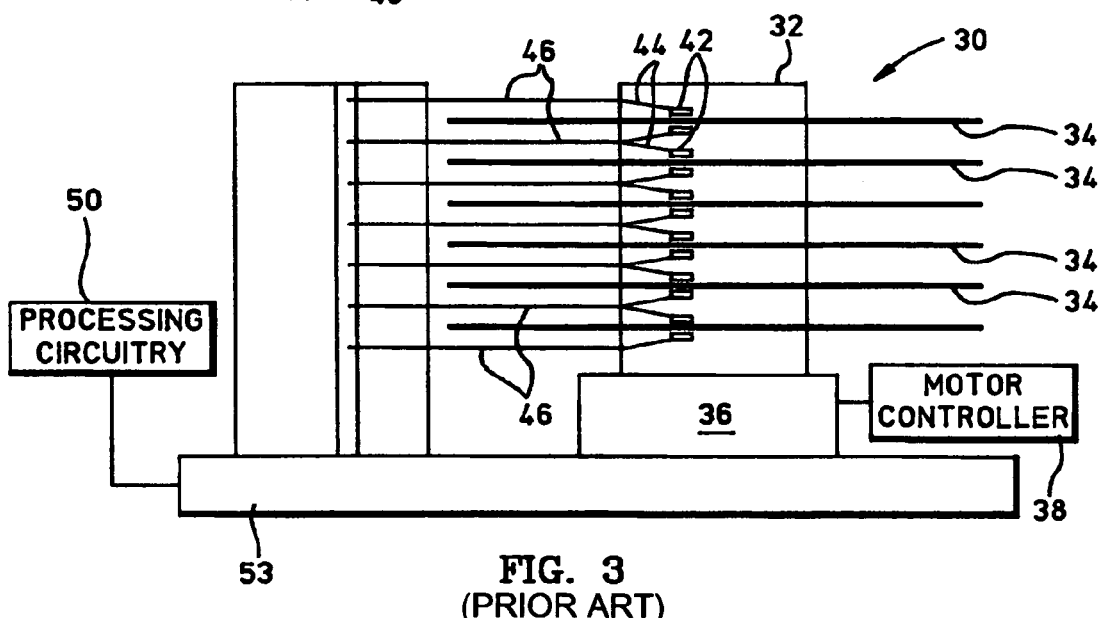
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1-3 a magnetic disk drive 30. Disk drive 30 includes a spindle 32 that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by motor 36, the slider is supported on a thin (typically, 0.05 μm) cushion of air (air bearing) between the disk and an air bearing surface (ABS) 48.

Figure 4:
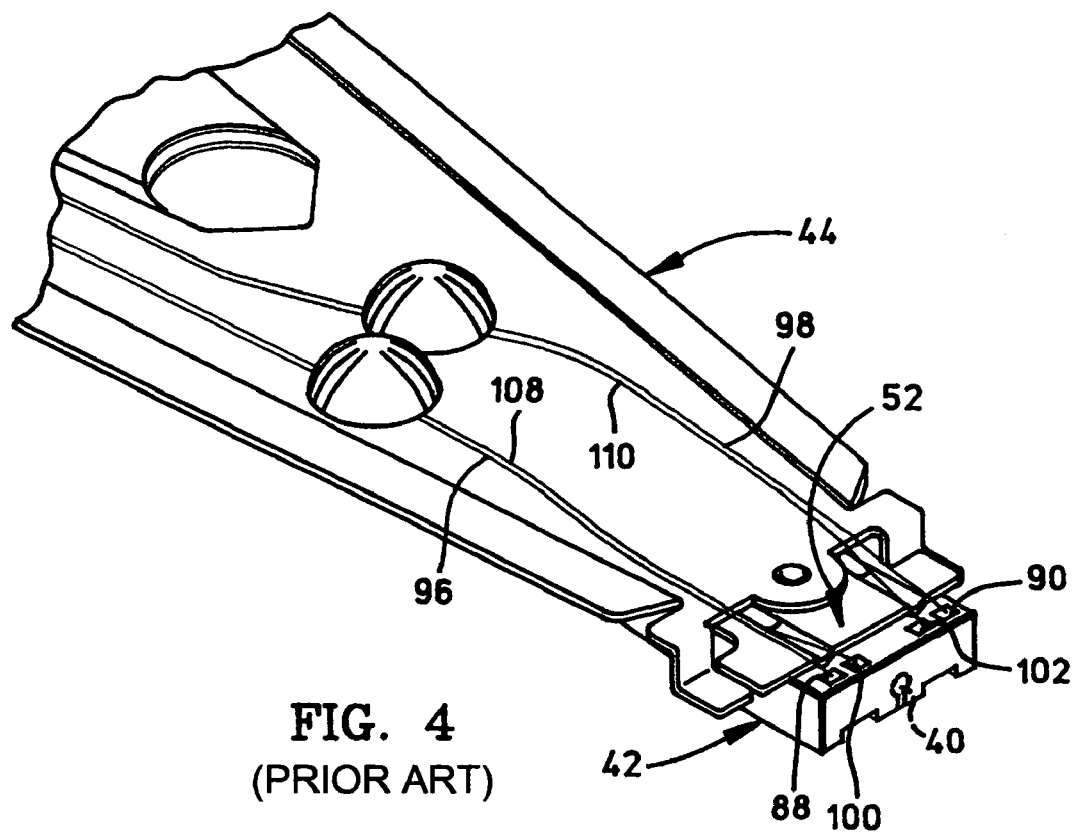
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with magnetic head 40, provides motor drive signals, and also provides control signals for moving slider 42 to various tracks. In FIGS. 1 and 4, slider 42 is shown mounted to a head gimbal assembly (HGA) 52 that is mounted to the suspension 44. All of the above components are supported on a base 53.

Figures 5, 7:
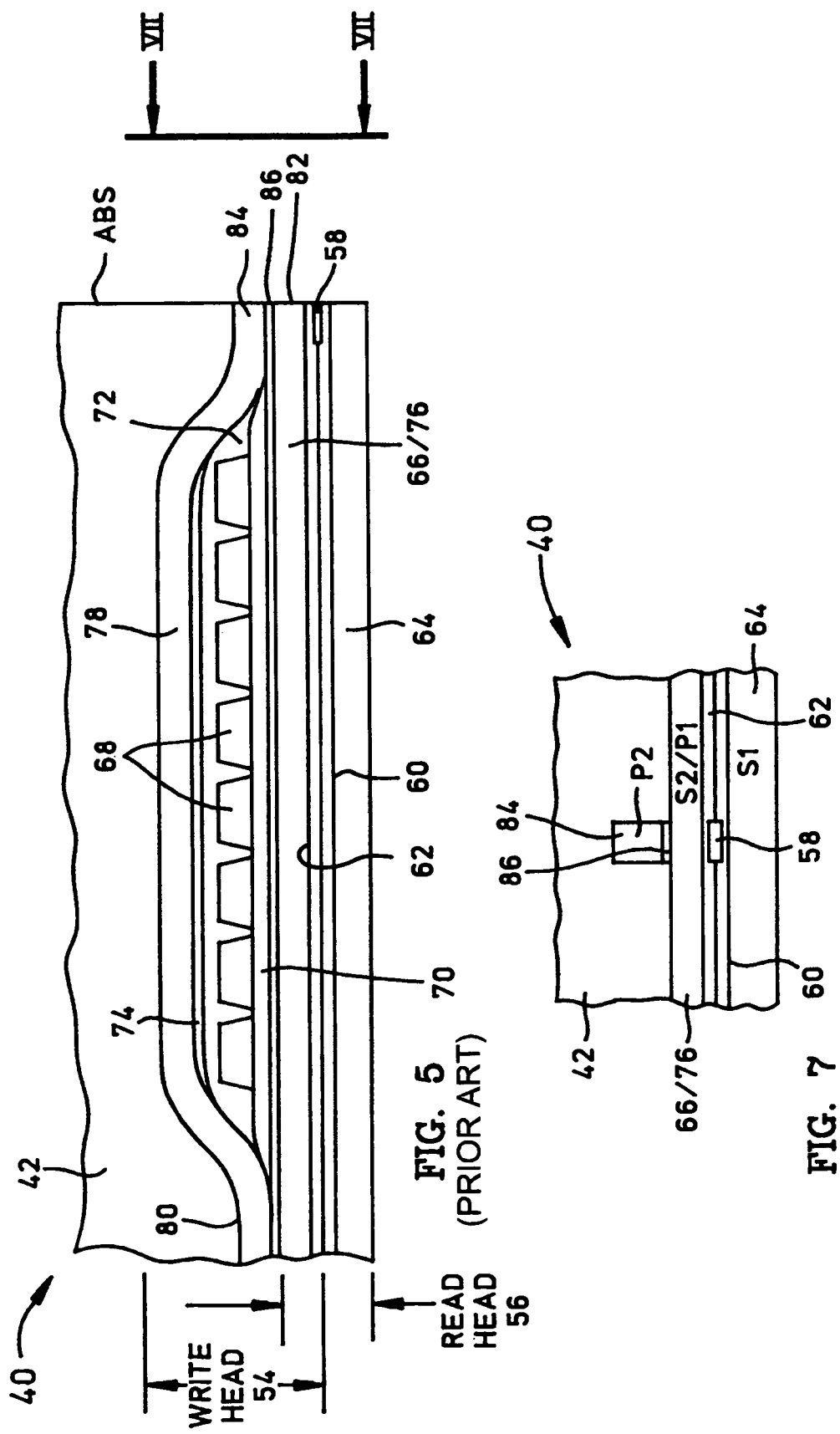
FIG. 5 is a partial elevation view of the slider and magnetic head as seen in plane V-V of FIG. 2.
FIG. 7 is a partial ABS view of the slider taken along plane VII-VII of FIG. 5 to show the read and write elements of the magnetic head.

FIG. 5 is a side cross-sectional elevation view of a merged magnetoresistive (MR) head 40, with a write head portion 54 and a read head portion 56. Read head portion 56 includes an MR sensor 58. MR sensor 58 is sandwiched between first and second gap layers 60 and 62 that are, in turn, sandwiched between first and second shield layers 64 and 66. In response to external magnetic fields, the resistance of MR sensor 58 changes. A sense current conducted through the sensor causes these resistance changes to be manifested as potential changes, which are processed by processing circuitry 50 shown in FIG. 3.

Figure 6:
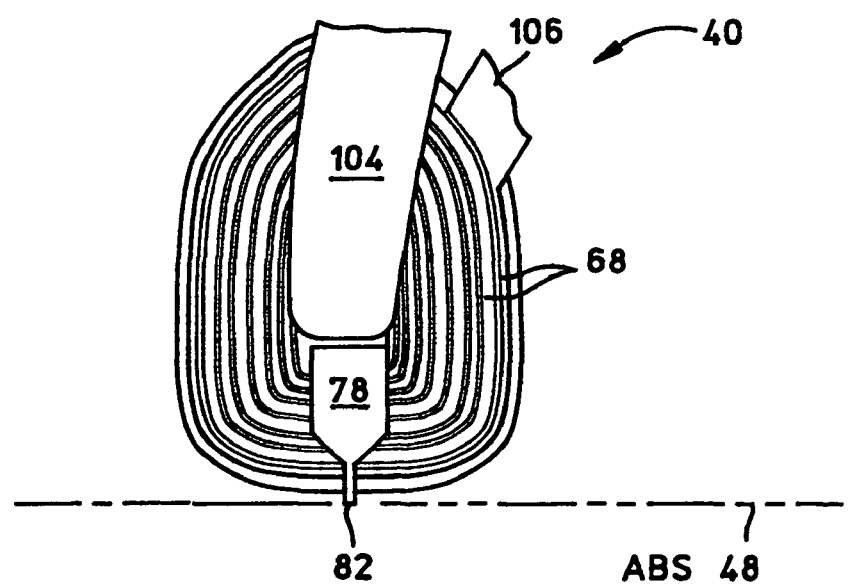
FIG. 6 is a top view of the second pole piece and coil layer, a portion of which is shown in FIG. 5, with all insulation material removed.

Write head portion 54 of the head includes a coil layer 68 sandwiched between first and second insulation layers 70 and 72. A third insulation layer 74 may be employed for planarizing the head to eliminate ripples in the second insulation layer caused by the coil layer 68. First, second and third insulation layers are referred to as an "insulation stack". Coil layer 68, and first, second and third insulation layers 70, 72 and 74, are sandwiched between first and second pole piece layers 76 and 78. First and second pole piece layers 76 and 78 are magnetically coupled at a back gap 80, and have first and second pole tips 82 and 84 that are separated by a non-magnetic gap layer 86 at the ABS. As shown in FIGS. 2 and 4, first and second solder connections 88 and 90 connect leads (not shown) from MR sensor 58 to leads 96 and 98 on suspension 44; third and fourth solder connections 100 and 102 connect leads 104 and 106 from coil 68 (see FIG. 6) to leads 108 and 110 on suspension 44.

Figure 8:
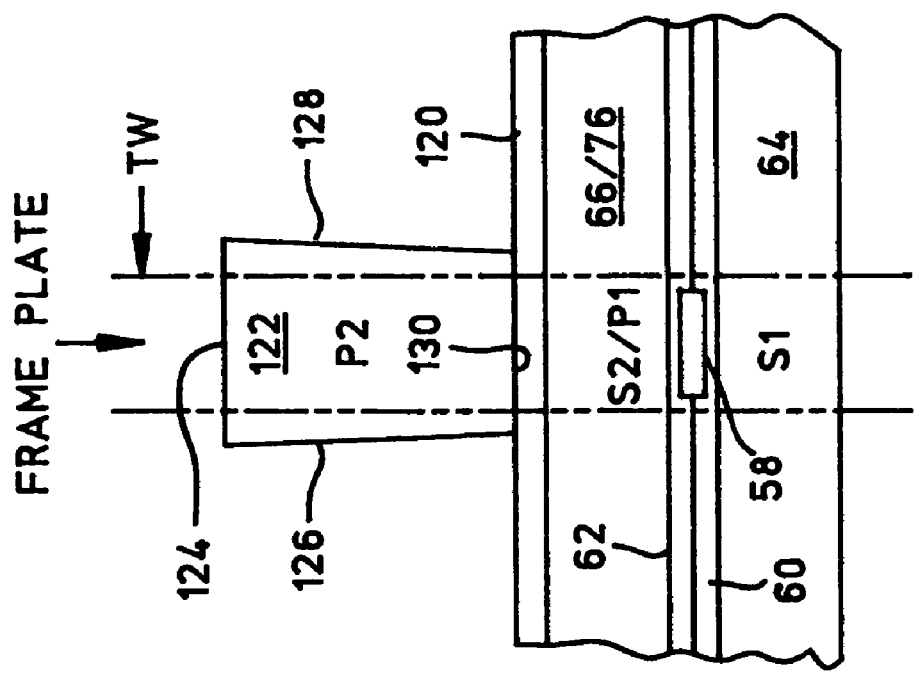
FIG. 8 is an ABS of a prior art head prior to notching the first pole piece.

FIG. 8 shows an ABS view of a prior art merged magnetic head, in which the second shield of the read head and the first pole piece of the write head are a common layer 66/76. Gap layer 120 has been formed on first pole piece layer 66/76, followed by frame plating a second pole tip 122 on gap layer 120. Second pole tip 122 is a front portion of the second pole piece. The second pole tip is bounded by a top 124, first and second side walls 126 and 128, and a base 130. The target track width (TW) is shown in FIG. 8. Since the first pole piece will be notched by ion milling, second pole tip 122 is larger than a target size track width (TW) of the second pole tip, so as to allow for consumption of the second pole tip during a subsequent milling cycle. Accordingly, before milling, first and second side walls 126 and 128 extend beyond the track width, and top 124 is higher than the target height. The dimensions of these sacrificial portions is referred to in the art as windage.

Figure 9:
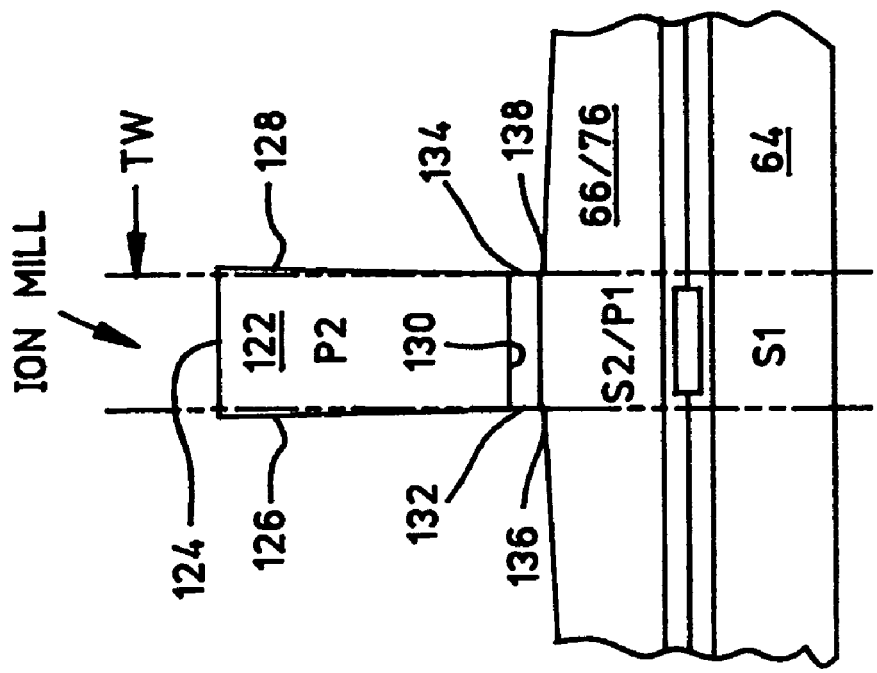
FIG. 9 is an ABS view of the prior art head of FIG. 8 after the first pole piece is formed with notches by milling.

In FIG. 9 ion milling is employed to mill through the gap layer to form a write gap 130 with first and second side walls 132 and 134, and to mill notches into the first pole piece 66/76 with first and second side walls 136 and 138. After milling, first side walls 126, 132 and 136 are contiguous, and second side walls 128, 134 and 138 are contiguous. This notching improves the transfer of flux between second pole tip 122 and first pole piece 66/76, since the flux will transfer to the pedestal portion of the first pole piece instead of the larger expanse thereof. This reduces side writing by the write head. The milling is at an angle to a normal to layers 66/76 and 64 in order to minimize redeposition of the milled material. It should be understood that the partially completed magnetic head in FIG. 9 rests upon a substrate (not shown) that is rotated during the milling cycle. The second pole tip is employed as a mask for forming write gap 130 and notching first pole piece at 136 and 138. It can be seen that this causes shadowing at notching sites 136 and 138 during approximately 180 degrees of the rotation, due to the angle of the milling. This shadowing increases the processing time required to form the notches in the first pole piece. It should be noted that the downward sloping portions of first pole piece layer 62 in FIG. 9 are formed due to the shadowing by second pole tip 122.

After milling, second pole tip 122 has been reduced in size. With the prior art method it is very difficult to reduce second pole tip 122 to the target track width and the target height because of the significant time required for milling the large lateral expanse of first pole tip 66/76. Milling of flat surfaces is very time-consuming as compared to side walls. Further, top 124 in FIG. 8 requires extra height because of the long time required for milling. This extra height increases the aspect ratio (ratio between height of resist employed to frame plate the second pole tip 122 and the target track width), which reduces the line width control capability of the second pole tip. Prior art methods of notching the first pole piece discussed in commonly assigned U.S. Pat. Nos. 5,438,747 and 5,452,164 indicate a strong-felt need to achieve self-aligned pole tips and to reduce the time required for notching.

Figure 10:
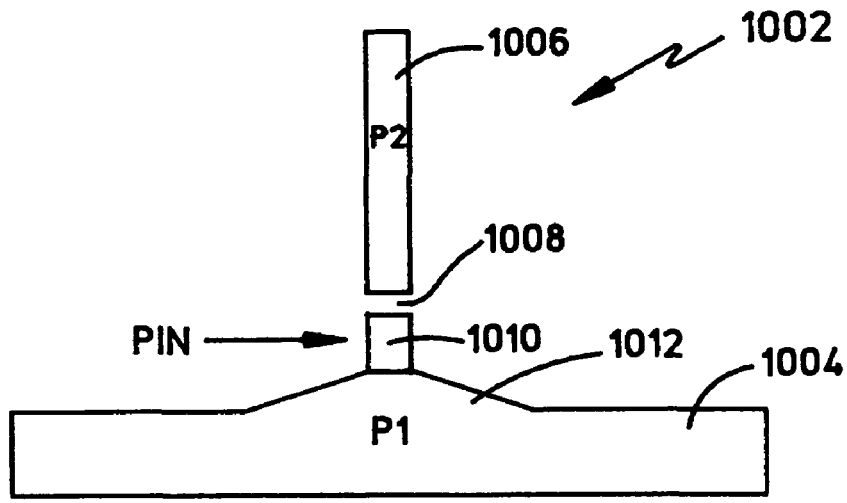
FIG. 10 is an ABS view of another prior art head formed with notches.
Figure 11:
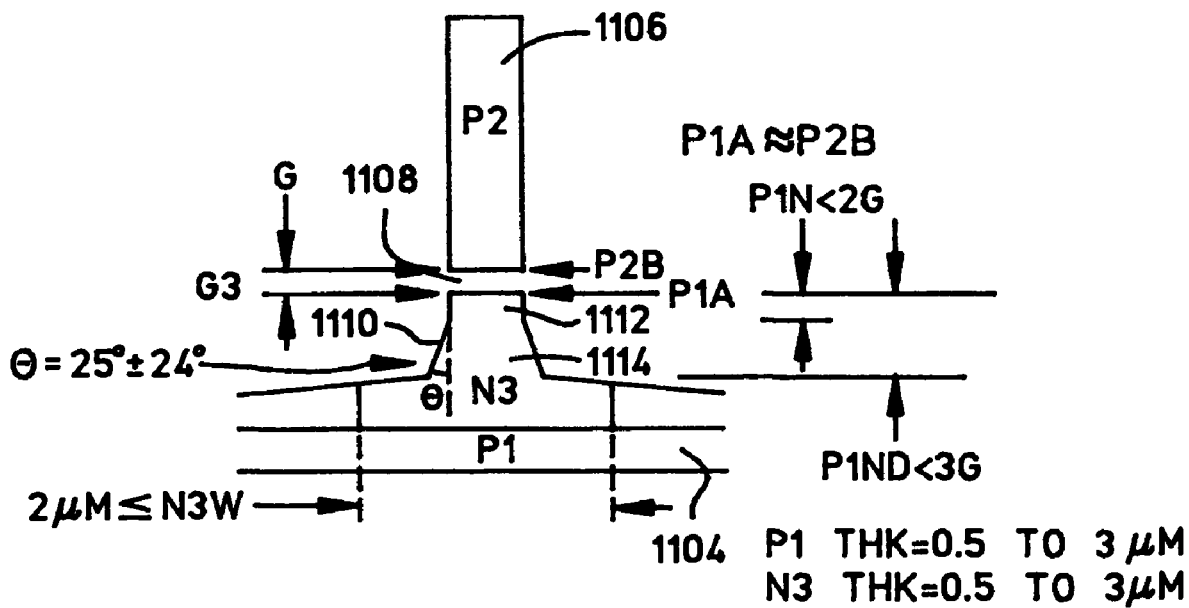
FIG. 11 is an ABS view of yet another prior art head formed with notches.
Figure 12:
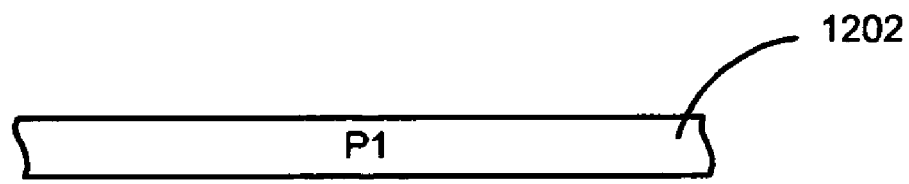
FIG. 12 is the first of a series of illustrations which are used to describe a method of making a magnetic write head in accordance with the present invention, which shows the formation of a first pole piece layer.

FIG. 10 shows another conventional magnetic head 1002 which has a first pole piece 1004 and a second pole piece 1006 separated by a gap 1008. Between first pole piece 1004 and gap 1008 is a notched pedestal 1010, which resides on a raised and angled surface 1012 of first pole piece 1004. The surface 1012 is raised and angled due to the ion milling process to form the notches. Note that notched pedestal 1010 itself has "straight" side walls (i.e. side walls that are zero degrees relative to normal). FIG. 11 is another conventional magnetic head 1102 having a notched pole piece structure which is described in U.S. patent Publication No. US 2003/0179498 A1 entitled "Magnetic Head Having A Notched Pole Piece Structure And Method Of Making The Same" by Inventors Hsiao et al. Magnetic head 1102 includes a first pole piece 1104 ("P1") and a second pole piece 1106 ("P2") separated by a gap 1108. Between first pole piece 1104 and gap 1108 is a central notched pedestal 1110 having angled side walls. By "angled," it is meant that the side walls slope outwardly at an angle greater than zero degrees (relative to normal). The angle at which the side walls slope is preferably 25 degrees±24 degrees. In decreasing order of generality, the angle may be 25 degrees±24 degrees; or 25 degrees±20 degrees; or 20 degrees±18 degrees; or 20 degrees±10 degrees; or between about 5-50 degrees. It has been observed that such angled side walls provide for an improved fringing field and overwrite capability as compared to the straight side walls of notched pedestal 1010 of FIG. 10. In this example, notched pedestal 1110 is formed of a top straight-walled portion 1112 having "straight" walls as well as a bottom angled-wall portion 1114 having the angled side walls. Below the bottom angled-wall portion 1114, bottom surfaces of notched pedestal 1110 have small outward downward slopes.

Figure 13:
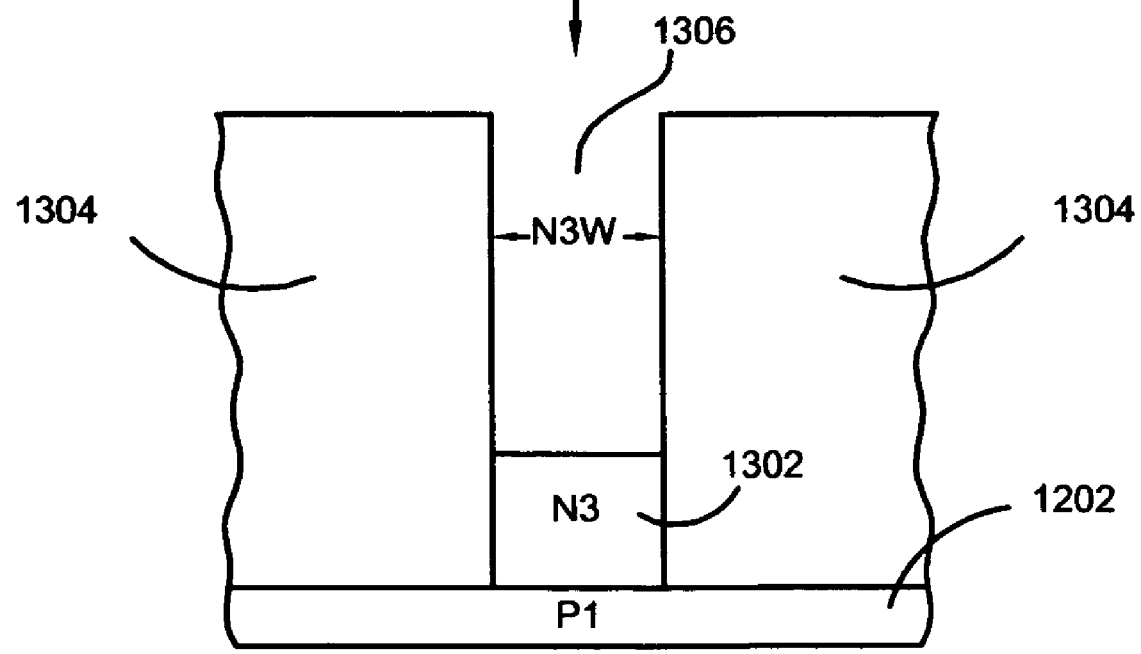
FIG. 13 is an illustration of that shown in FIG. 12 except that a patterned resist is formed over the first pole piece layer and a magnetic pedestal is electroplated within a channel of the patterned resist.

An improved method of making such a magnetic head will now be described in relation to FIGS. 12-21. Beginning with FIG. 12, a first pole piece layer 1202 ("P1") is formed by electroplating materials over a substrate. First pole piece layer 1202 is made of a magnetic material, preferably one with a high magnetic moment, such as nickel-iron. (NiFe), cobalt-iron (CoFe), or cobalt-iron-nitride (CoFeN). In FIG. 13, a patterned resist 1304 is formed over first pole piece layer 1202. Preferably, patterned resist is a photoresist such as a chemically-amplified resist; however a non-chemically-amplified resist may be suitable as an alternative. As shown, patterned resist 1304 is formed with a channel 1306 in a central region over first pole piece layer 1202 using conventional lithography techniques. Channel 1306 within patterned resist 1304 is formed with a width that is identified as "N3W" in the drawing.

Figure 14:
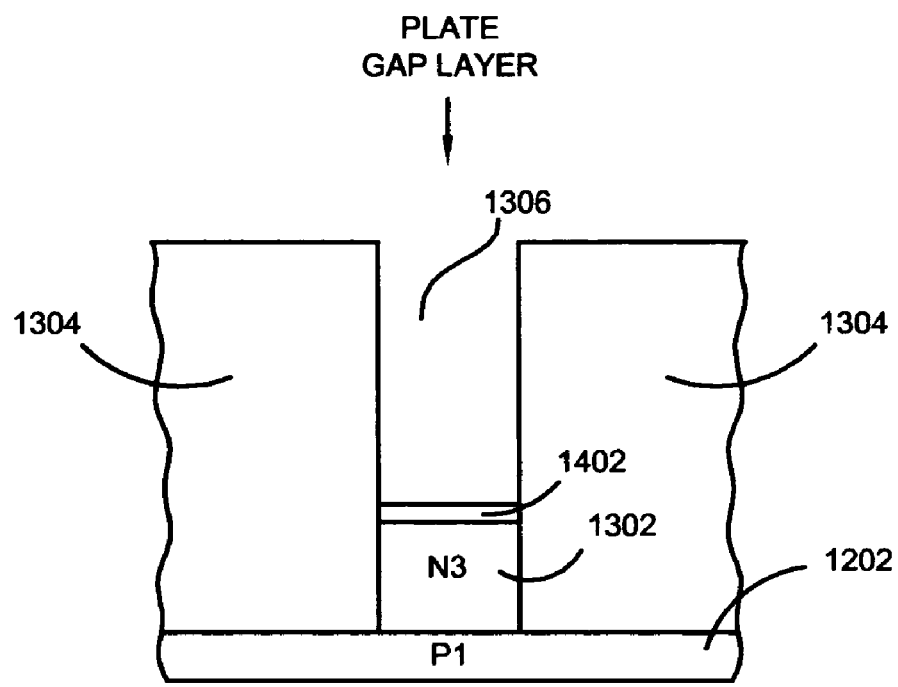
FIG. 14 is an illustration of that shown in FIG. 13 except that a metal gap layer is electroplated over the pedestal within the channel of the patterned resist.

Also in FIG. 13, a first pole piece pedestal 1302 ("N3") is electroplated over first pole piece layer 1202 within channel 1306. Pedestal 1302 is made of a magnetic material, preferably one with a high magnetic moment, such as NiFe, CoFe, or CoFeN. Preferably, pedestal 1302 is plated to a thickness between about 0.3-3.0 µm, and preferably to a thickness of about 2 µm. The thickness of patterned resist 1304 is much greater than the thickness of pedestal 1302 as shown in the drawing. The width of pedestal 1302 (i.e. "N3W") is preferably between 0.3-0.5 µm. In FIG. 14, a gap layer 1402 ("gap") is then electroplated over pedestal 1302 within channel 1306. Preferably, gap layer 1402 is made of a non-magnetic metal. Examples of gap layer 1402 of the non-magnetic metal type include rhodium (Rh), nickel-phosphorous (NiP), chromium (Cr), gold (Au), and alloys thereof. The thickness of gap layer 1402 of the non-magnetic metal type varies between about 500-2000 Angstroms, and in the present example it has a thickness of about 1000 Angstroms if NiP or Rh is used. Note that gap layer 1402 may serve as a seed layer for the subsequent electroplating of the second pole piece, and a separate seed layer is not necessary.

Figure 15:
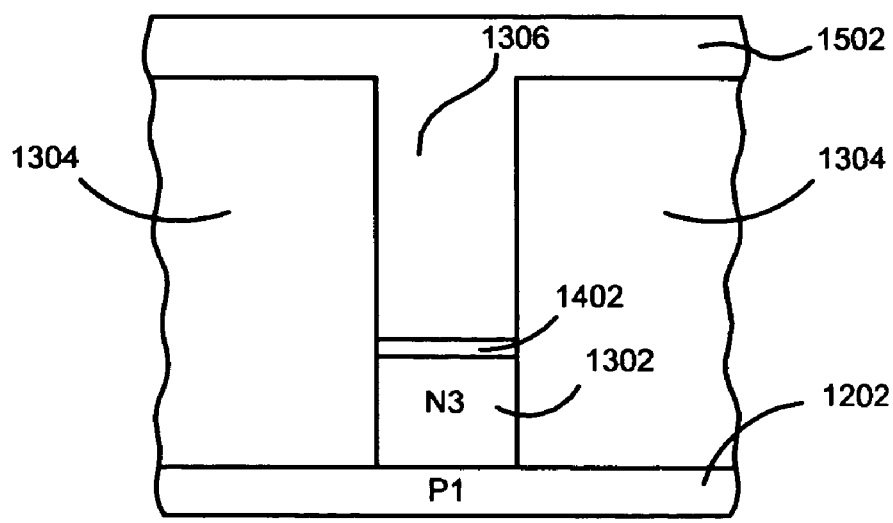
FIG. 15 is an illustration of that shown in FIG. 14 except that a resist channel shrinking film is formed over the patterned resist.

In FIG. 15, a resist channel shrinking film 1502 is then formed over the patterned resist 1304 within channel 1306. Resist channel shrinking film 1502 is any suitable film that assists in the shrinking of a channel or trench formed within a patterned resist. One suitable film is commercially available from Tokyo Ohka Kogyo (TOK) Co., Ltd. in Kanagawa, Japan, and referred to as SAFIER™ (Shrink Assist Film for Enhanced Resolution) coating; product FSC-9220 GM may be utilized, for example. SAFIER™ is a trademark of TOK Co., Ltd. Another suitable film is commercially available from Clariant Corporation of Muttenz, Switzerland, and referred to as a RELACS® (Resolution Enhancement Lithography Assisted by Chemical Shrinking) coating; product R-500 may be utilized, for example. RELACS is a registered trademark of the Clariant Corporation. These two resist channel shrinking films serve the same purpose of shrinking channel 1306 of patterned resist 1304 when baked, but the way in which these films achieve this result is different. Note that both of these films are water-soluble and removable by applying water after use.

Figure 16:
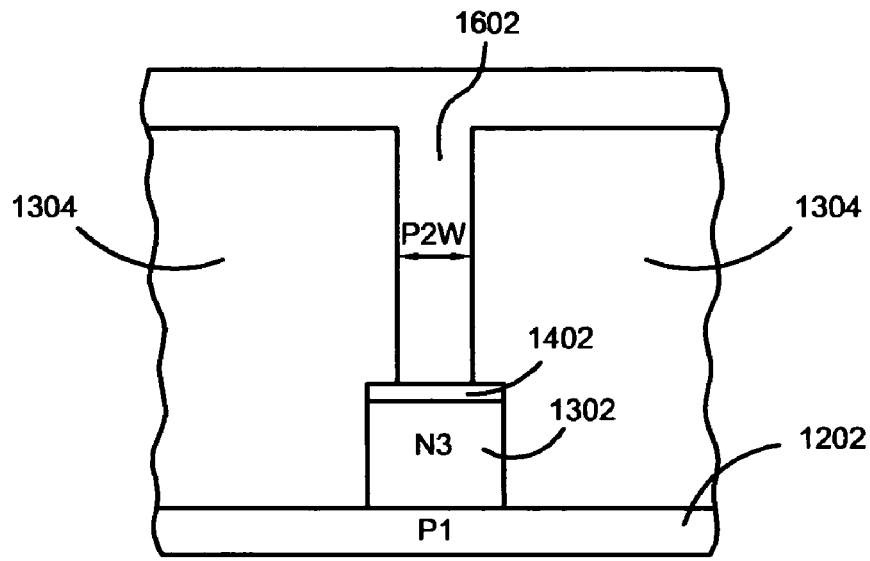
FIG. 16 is an illustration of that shown in FIG. 15 except that the resist channel shrinking film over the patterned resist is baked such that a reduced-width channel is formed over the pedestal and gap layer.
Figure 17:
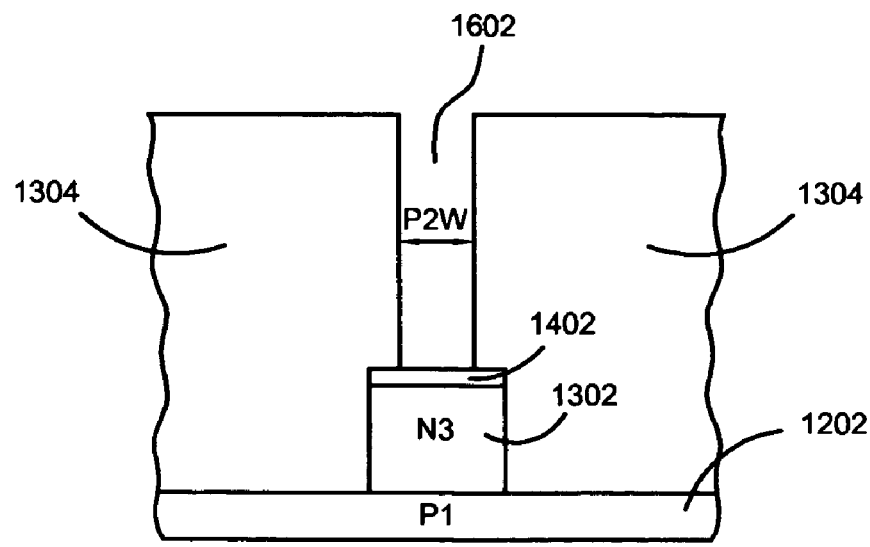
FIG. 17 is an illustration of that shown in FIG. 16 except that the resist channel shrinking film is removed.

In FIG. 16, the resist channel shrinking film 1502 over patterned resist 1304 is then baked. The baking process causes the channel within patterned resist 1304 to shrink to a reduced-width channel 1602. In FIG. 16, the width of reduced-width channel 1602 is represented as "P2W". The heating temperature and baking time is not limited to any particular values as long as the temperature is sufficient high enough to cause thermal shrinkage of film 1502. Preferably, the heat treatment may be performed within a temperature range of about 80-160° C. for 60-120 seconds. Also preferably, heating is performed so as to not cause excessive thermal fluidizing of patterned resist 1304. Using this process, each side of patterned resist 1304 within channel 1602 is extended proportionately such that channel 1602 is substantially centered with precision over pedestal 1302. Note that the widths of pedestal 1302 and gap layer 1402 are unaffected by the baking process and remain the same. Resist channel shrinking film 1602 is then removed by washing with water and the resulting structure with the film removed is shown in FIG. 17. Preferably, pure water is used in the wash for between about 3.0-120 seconds. Note also that the steps of applying the film (FIG. 15), baking to reduce the width (FIG. 16), and washing may be repeated for further reductions in the width, as desired.

The reduced-width channel may be produced by an expansion of the resist materials within the channel during the baking process (e.g. using SAFIER film). Under the resulting force of thermal shrinkage of film 1502, the dimensions of patterned resist 1304 in contact with film 1502 will increase by an amount equivalent to the thermal shrinkage of film 1502 and, as a result, patterned resist 1304 widens and accordingly the spacing within the channel lessens. The spacing within the channel determines the diameter or width of the patterned element to be finally obtained; the decrease in the spacing within the channel contributes to reducing the diameter of the element. Alternatively, the reduced-width channel may be produced by a growth of materials within the channel during the baking process (e.g. using RELACS film). After exposure and development of the photoresist used to produce the patterned resist, acids are released from sidewalls within the channel of the patterned resist. These acids diffuse within the resist channel shrinking film formed thereover, resulting in a cross-linking and growth of thin layers around the sidewalls. This produces a reduction in width of the channel. As another alternative, the reduced-width channel may be produced by a combination of an expansion of the resist materials within the channel (e.g. SAFIER) and a growth of materials within the channel (e.g. RELACS).

Note that, in steps of FIG. 15-17, other alternative channel shrink techniques known to those skilled in the art may be utilized. Examples of these include reflow processes, Chemical Amplification of Resist Lines (CARL) processes, and Water-Soluble Organic Overcoating Material (WASOOM) processes. See e.g. K. Aramaki, T. Hamada, D. K. Lee, H. Okazaki, N. Tsugama, G. Pawlowski, "Techniques to Print sub-0.2 µm Contact Holes," SPIE 3999, pages 738-749 (2000); J. Kim, C. Choi, M. Kim, C. Bok, H. Kim, K. Baik, "Implementation of Sub-150 nm Contact Hole Pattern by Resist Flow Process," Journal of Applied Physics 37, pages 6863-6868 (1998); and J. Chun, S. Bakshi, S. Barnett, J. Shih, S K. Lee, "Contact Hole Size Reducing Methods by using Water-Soluble Organic Overcoating material (WASOOM) as a barrier layer toward 0.15 µm: Resist flow Technique I," SPIE 3999, pages 620-626 (2000).

Figure 18:
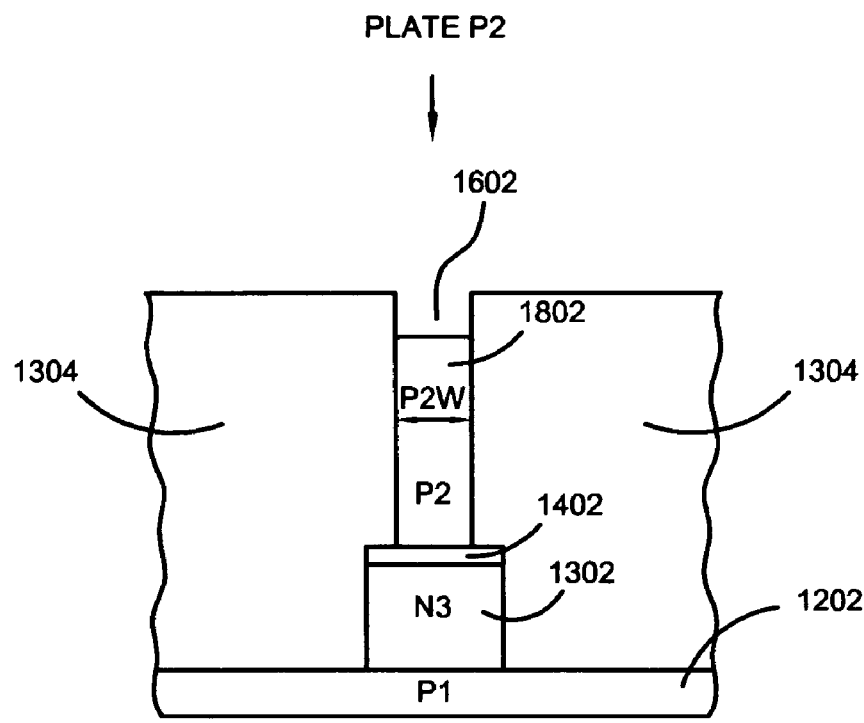
FIG. 18 is an illustration of that shown in FIG. 17 except that a second pole piece is electroplated within the reduced-width channel.
Figure 19:
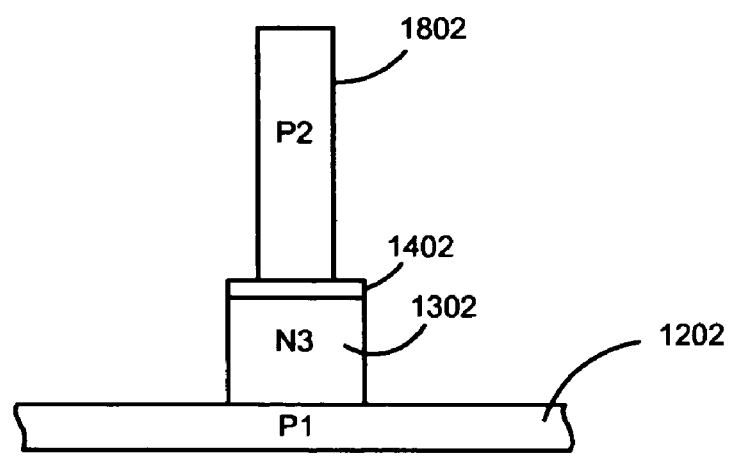
FIG. 19 is an illustration of that shown in FIG. 18 except that the patterned resist is removed.

In FIG. 18, a second pole piece 1802 ("P2") is then electroplated over gap layer 1402 within reduced-width channel 1602. Second-pole piece 1802 is made of a magnetic material, preferably one with a high magnetic moment such as nickel-iron (NiFe), cobalt-iron (CoFe), or cobalt-iron-nitride (CoFeN). The width of second pole piece 1802 may be formed to anywhere between about 0.2-0.5 microns, such as about 0.3 microns, but will be reduced in size from a subsequent ion milling process for notching pedestal 1302 (described later below). Since reduced-width channel 1602 is centered with precision over pedestal 1302, second pole piece 1802 is centered with precision over pedestal 1302. This self-alignment greatly improves the subsequent notching process described below. The patterned resist 1304 is then removed with use of a suitable solvent, and the resulting structure with the removed resist is shown in FIG. 19.

Figure 20:
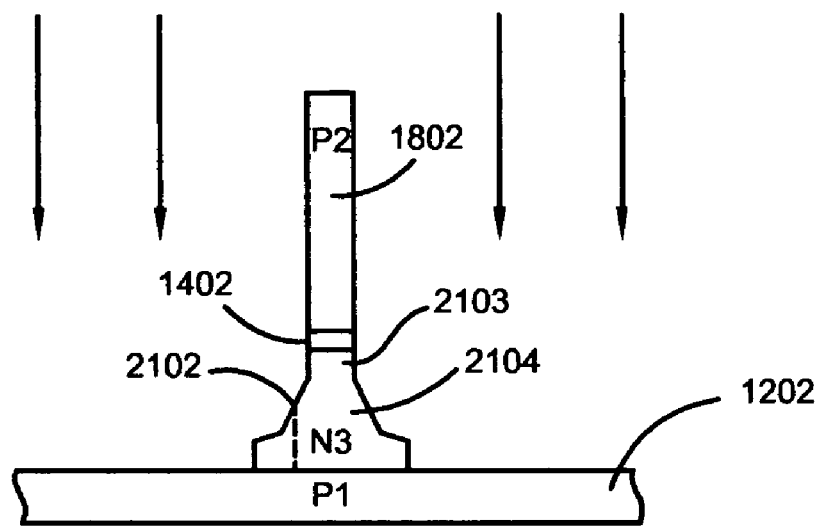
FIG. 20 is an illustration of that shown in FIG. 19 except that an ion milling on the pedestal has been performed, using the second pole piece as a mask, to form a central notched pedestal having side walls with angled slopes.
Figure 21:
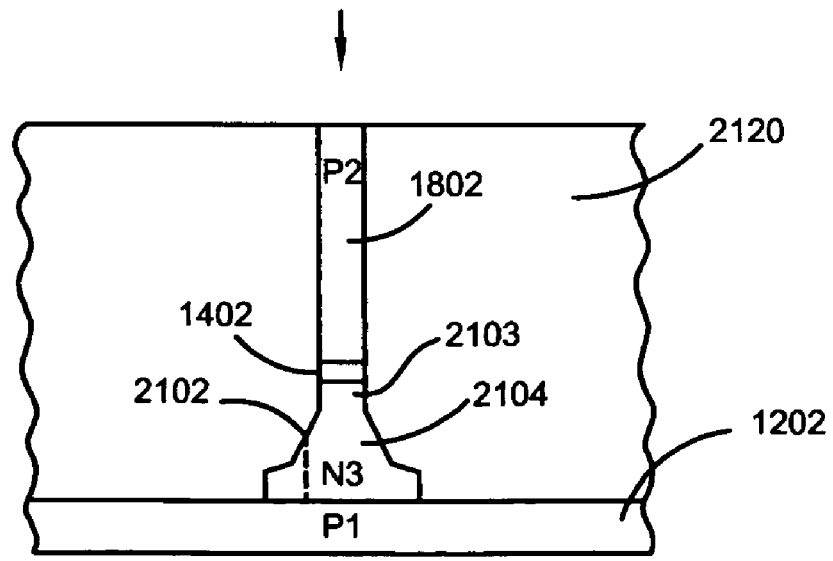
FIG. 21 is an illustration of that shown in FIG. 20 except that insulator materials are deposited around the first and second pole pieces.

In FIG. 20, pedestal 1302 is then notched by an ion milling process using second pole piece 1802 as a milling mask. With a notching and trimming process, second pole piece 1802 gradually shrinks in size during the ion milling, such that pedestal 1302 is formed into a notched pedestal 2102. The notching is performed at least until first and second pole tips of the first and second pole pieces have the same width. Note that side portions of gap layer 1402 were also removed by the milling. In this embodiment, notched pedestal 2102 has a straight-walled portion 2103 and an angled-wall portion 2104 formed below straight-walled portion 2103. Preferably, the angle of each side wall of angled-wall portion 2104 is about 25 degrees±24 degrees relative to normal (see dashed line in FIG. 20). More preferably, each side wall is angled at least 5 degrees relative to normal within these bounds. The resultant width for second pole piece 1802 after such ion milling, which helps define the trackwidth, may be between about 0.05-0.2 micrometers. After the notching process, other processing steps depicted in FIG. 21 may be performed such as depositing insulator materials 2120 (e.g. alumina) around the pole pieces and performing a planarization process such as a chemical-mechanical polish (CMP) to form a top planarized surface.

Figure 28:
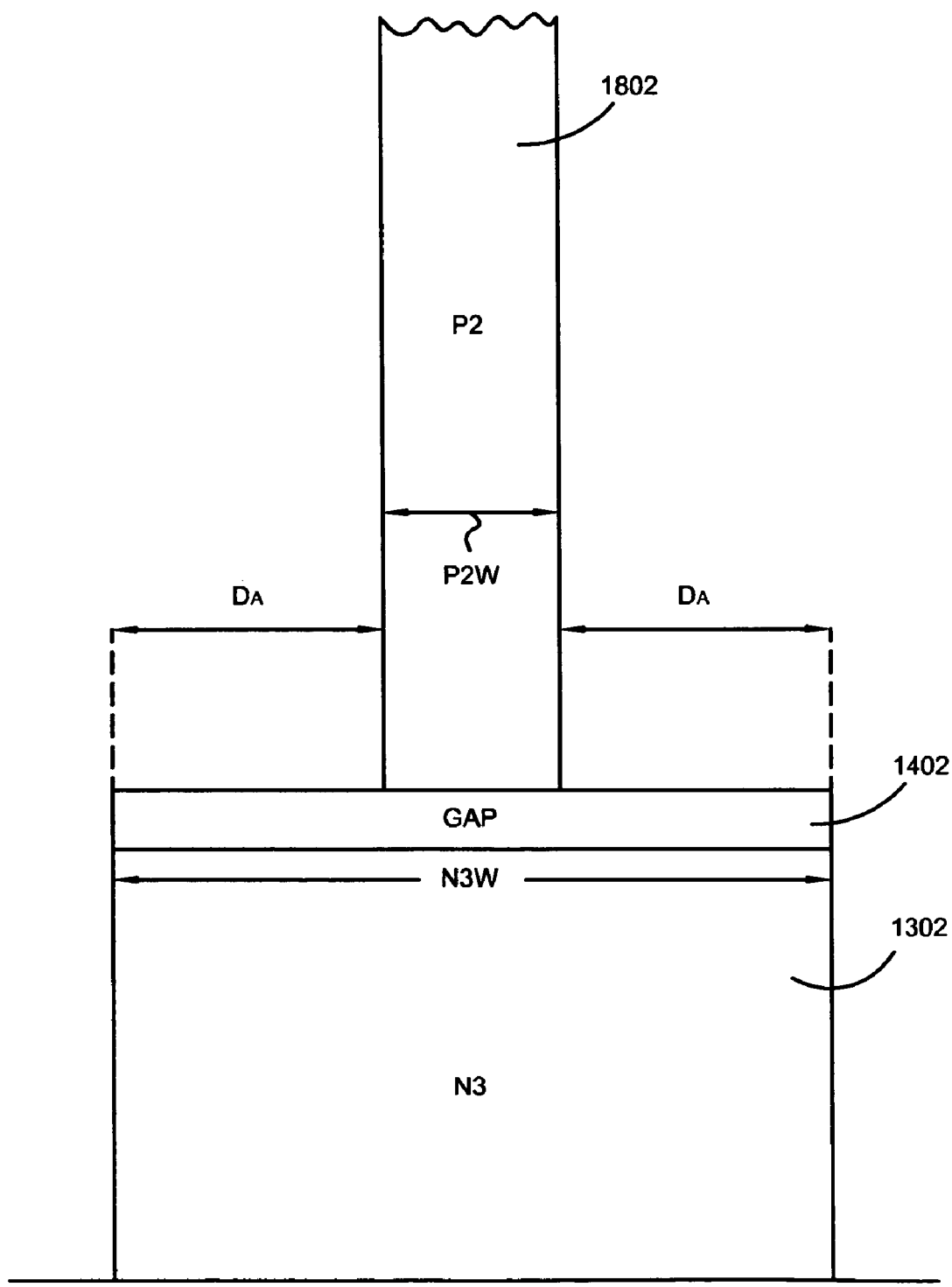
FIG. 28 is a close-up view of the second pole piece being centered with precision relative to the underlying pedestal.

Since the second pole piece is precisely centered over the pedestal, the pedestal can be notched substantially symmetrically. When the notched pedestal is appropriately formed and is substantially symmetric, the magnetic head has suitable overwrite (OW) properties and shows little if any adjacent track interference (ATI) problems. A precise centering of the second pole piece is depicted in more detail in FIG. 28. FIG. 28 corresponds to the structure in the step previously shown in relation to FIG. 19. In FIG. 28 it is shown that the leftmost edge of second pole piece 1802 and the leftmost edge of pedestal 1302 are separated by a distance $D_A$, and the rightmost edge of second pole piece 1802 and the rightmost edge of pedestal 1302 are separated by a distance $D_B$. From to the precise centering of second pole piece 1802 relative to pedestal 1302, $D_A+D_B \leq 0.3$ microns and $|D_A-D_B| \leq 0.2$ microns. The width of pedestal 1302 ("N3W" in FIG. 28) minus the width of second pole piece 1802 ("P2W" in FIG. 28) can be as small as 0.2 microns. If N3W–P2W≤1 micron, then a steep notched pedestal can be achieved with much less consumption of second pole piece 1802 (i.e. its P2W) during the ion mill. A magnetic head having a thicker resulting second pole piece 1802 tends to have better OW performance.

Figure 22:
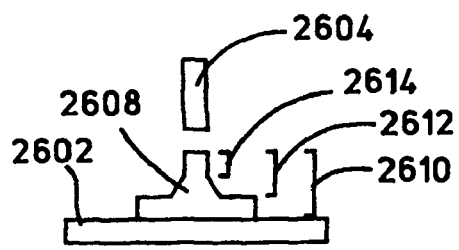
FIGS. 22-25 are other examples of a notched pedestal having angled side walls.

In general, the notched pedestal of the pedestal may take on a variety of shapes and dimensions, as shown and described in relation to FIGS. 22-25. FIG. 22 shows a notched pedestal 2608 formed on a first pole piece 2602 which is adjacent a second pole piece 2604. As shown, notched pedestal 2608 has a bottom straight-walled structure, a middle angled-wall portion, and a top straight-walled portion. The angle of each angled side wall of the angled-wall portion is preferably 25 degrees±24 degrees. Notched pedestal 2608 has a total height 2610 of 0.1-0.5 µm, where the middle angled-wall and top straight-walled portions have a combined height 2612 of 0.3 µm and the top straight-walled portion alone has a height 2614 of less than 0.1 µm. The thickness of the gap is about 0.12 µm. The bottom straight-walled portion has a width that is much greater than the width of the angled-wall portion (e.g., 4 µm+the width of second pole piece 2604). The bottom straight-walled portion may alternatively have ends that extend all the way over the ends of first pole piece 2602. The top straight-walled portion has a width that is substantially the same as the width of second pole piece 2604.

Figure 23:
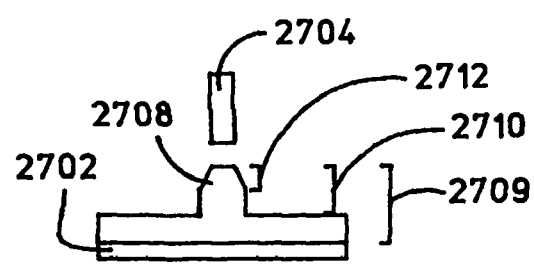

As another example, FIG. 23 shows a notched pedestal 2708 formed on a first pole piece 2702 which is adjacent a second pole piece 2704. As shown, notched pedestal 2708 has a bottom portion, a middle straight-walled portion, and a top angled-wall portion. No straight-walled portion above the top angled-wall portion is formed. The angle of each angled side wall of the top angled-wall portion is 25 degrees±24 degrees. Notched pedestal 2708 has a total height 2709 of 1-5 µm; the middle straight-walled portion and the top angled-wall portion have a combined height 2710 of 0.24 µm; and the top angled-wall portion alone has a height of 0.1-0.5 µm. The thickness of the gap is about 0.12 µm. The middle straight-walled portion has a width that is equal to the width of the bottom of the angled-wall portion, and the bottom portion has ends that extend over the ends of second pole piece 2702.

Figure 24:
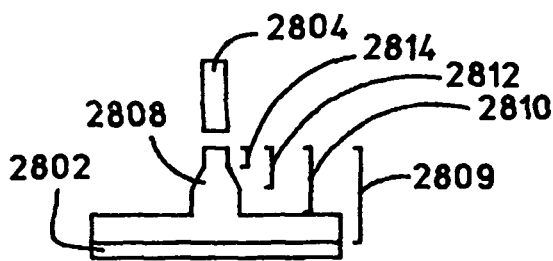

In yet another example, FIG. 24 shows a notched pedestal 2808 formed on a first pole piece 2802 which is adjacent a second pole piece 2804. As shown, notched pedestal 2808 has a bottom portion, middle straight-walled portion, a middle angled-wall portion, and a top straight-walled portion. The angle of each angled side wall of the middle angled-wall portion is 25 degrees±24 degrees. Notched pedestal 2808 has a total height 2809 of 1-5 µm, where the middle and top portions have a combined height 2810 of 0.24 µm, the middle angled-wall portion and top straight-walled portion have a combined height 2812 of 0.1-0.5 µm and the top straight-walled portion alone has a height 2814 of 0-0.4 µm. The thickness of the gap is about 0.12 µm. The middle straight-walled portion has a width that is equal to the width of the bottom of the middle angled-wall portion. The top straight-walled portion has a width that is substantially the same as the width of second pole piece 2804.

Figure 25:
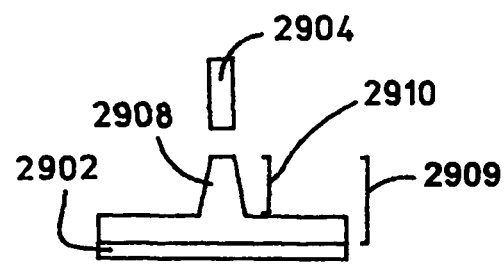

In yet even another example of this type, FIG. 25 shows a notched pedestal 2908 formed on a first pole piece 2902 which is adjacent a second pole piece 2904. As shown, notched pedestal 2908 has a bottom portion and a top angled-walled portion. The angle of each angled side wall of the top angled-wall portion is preferably 25 degrees±24 degrees. Notched pedestal 2908 has a total height 2909 of 1-5 µm, where the top angled-wall portion alone has a height 2910 of about 1.5 µm. The thickness of the gap is about 0.16 µm. The top of the top angled-wall portion has a width that is substantially the same as the width of second pole piece 2904.

Figure 26:
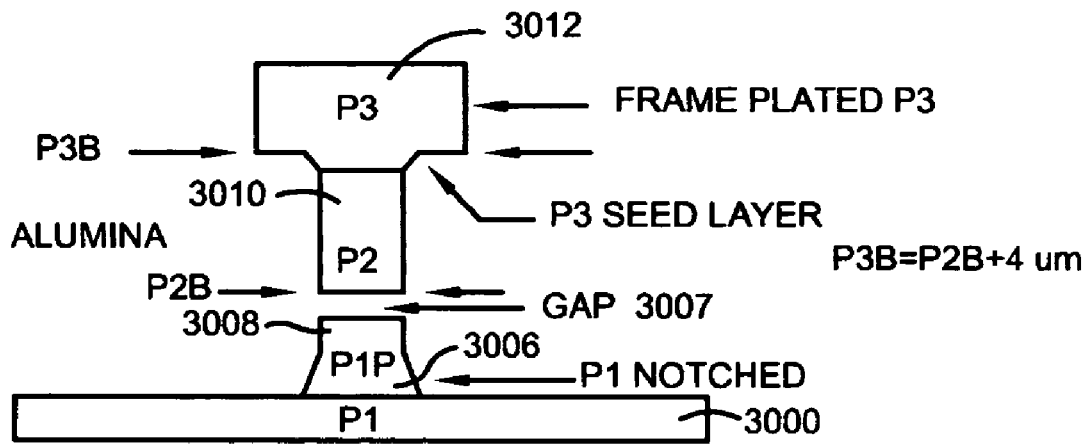
FIGS. 26-27 are further examples of notched pedestals having angled side walls.
Figure 27:
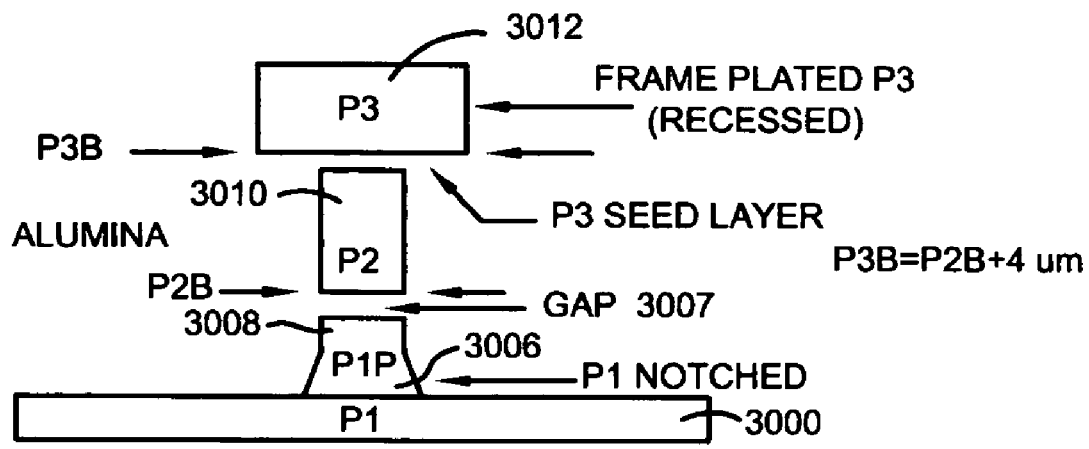

FIGS. 26-27 show other write heads having a notched pedestal of an alternate embodiment using a third pole piece. A notched pedestal 3006 having an angled-walled portion 3008 is formed over a first pole piece 3000. A second pole piece 3010 is separated from notched pedestal 3006 by a gap 3007 and is adjacent a third pole piece 3012. Third pole piece 3012, which is frame plated over second pole piece 3010, also has an angled notched pedestal and is separated from second pole piece 3010 by a high magnetic moment seed layer. The magnetic head in FIG. 27 is the same as that in FIG. 26 except that it is recessed from second pole piece 3010 at the ABS.

Final Comments. Thus, methods of making magnetic write heads with use of line width shrinkage techniques have been described. In one illustrative example, the method includes the acts of forming a first pole piece layer of a first pole piece; forming a patterned resist over the first pole piece layer; electroplating a pedestal over the first pole piece layer within a channel of the patterned resist; forming a gap layer over the pedestal within the channel of the patterned resist; forming a resist channel shrinking film over the patterned resist; baking the resist channel shrinking film over the patterned resist to reduce a width of the channel; removing the resist channel shrinking film; electroplating a second pole piece within the reduced-width channel of the patterned resist; removing the patterned resist; and milling the pedestal, using the second pole piece as a mask, to form a central notched pedestal having side walls with angled slopes. Advantageously, the reduction in channel width using the resist channel shrinking film provides for self-alignment of the second pole piece with the pedestal which can be symmetrically notched for improved OW properties and reduced ATI.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special particular meaning different from their plain language meaning, and therefore the specification is not to be used to define terms in an unduly narrow sense.

What is claimed is:

1. A method for use in making a magnetic head, comprising:
   forming a first pole piece layer of a first pole piece;
   forming a patterned resist over the first pole piece layer;
   electroplating a pedestal over the first pole piece layer within a channel of the patterned resist;
   forming a gap layer over the pedestal within the channel of the patterned resist;
   forming a resist channel shrinking film over the patterned resist;
   baking the resist channel shrinking film to thereby reduce a width of the channel of the patterned resist;
   removing the resist channel shrinking film;
   electroplating a second pole piece within the reduced-width channel of the patterned resist;
   removing the patterned resist; and
   milling the pedestal, using the second pole piece as a mask, to form a central notched pedestal having side walls with angled slopes.

2. The method of claim 1, wherein the reduced-width channel is reduced such that the second pole piece is centered relative to the pedestal.

3. The method of claim 1, wherein the central notched pedestal is formed to be symmetrical.

4. The method of claim 1, further comprising:
   wherein the reduced-width channel is reduced sufficiently such that the second pole piece is centered relative to the pedestal; and
   wherein the central notched pedestal is formed to be symmetrical due to the centering of the second pole piece and the act of milling.

5. The method of claim 1, further comprising:
   repeating the acts of forming the resist channel shrinking film and baking to further reduce the width of the reduced-width channel.

6. The method of claim 1, further comprising:
   forming a seed layer over the gap layer.

7. The method of claim 1, wherein the gap layer comprises a non-magnetic insulator.

8. The method of claim 1, wherein the gap layer comprises a non-magnetic metal.

9. The method of claim 1, wherein the gap layer comprises a non-magnetic metal selected from the group consisting of rhodium, tantalum/rhodium, chromium, and gold.

10. The method of claim 1, wherein the reduced-width channel is produced by an expansion of resist materials within the channel during the act of baking.

11. The method of claim 1, wherein the reduced-width channel is produced by a growth of materials within the channel during the act of baking.

12. A method for use in making a magnetic head, comprising:
    forming, within a channel of a patterned resist, a first pole piece pedestal and gap layer over the first pole piece pedestal;
    forming a resist channel shrinking film within the channel of the patterned resist;
    baking the resist channel shrinking film over the patterned resist to thereby reduce a width of the channel of the patterned resist;
    removing the resist channel shrinking film; and
    electroplating a second pole piece within the reduced-width channel of the patterned resist.

13. The method of claim 12, further comprising:
    removing the patterned resist; and
    milling the pedestal, using the second pole piece as a mask, to form a central notched pedestal having side walls with angled slopes.

14. The method of claim 12, wherein the act of forming the pedestal comprises the further act of electroplating pedestal materials within the channel of the patterned resist.

15. The method of claim 12, wherein the resist comprises a chemically-amplified photoresist.

16. The method of claim 12, wherein the reduced-width channel allows for the second pole piece to be centered relative to the pedestal.

17. The method of claim 12, further comprising:
    removing the patterned resist;
    milling the pedestal, using the second pole piece as a mask, to form a central notched pedestal having side walls with angled slopes;
    wherein the reduced-width channel allows for the second pole piece to be centered relative to the pedestal; and
    wherein the central notched pedestal is formed to be symmetrical by the centering of the second pole piece and the act of milling.

18. The method of claim 12, further comprising:
    prior to forming the pedestal and the gap layer, forming a first pole piece layer of a first pole piece over which the pedestal is subsequently formed.

19. The method of claim 12, wherein the gap layer comprises a non-magnetic metal that is electroplated within the channel of the patterned resist.

20. The method of claim 12, wherein the gap layer comprises a non-magnetic metal selected from the group consisting of rhodium, tantalum/rhodium, chromium, and gold, which is electroplated within the channel of the patterned resist.

21. The method of claim 12, wherein the first pole piece pedestal and the second pole piece comprise magnetic materials and the gap layer comprises a non-magnetic material.

22. The method of claim 12, further comprising:
repeating the acts of forming the resist channel shrinking film and baking to further reduce the width of the reduced-width channel.

23. The method of claim 12, wherein the reduced-width channel is produced by an expansion of resist materials within the channel during the act of baking.

24. The method of claim 12, wherein the reduced-width channel is produced by a growth of materials within the channel during the act of baking.

25. A method for use in forming an inductive write head, comprising:
forming, within a channel of a patterned resist, a first pole piece pedestal and gap layer over the first pole piece pedestal;
forming a resist channel shrinking film within the channel of the patterned resist; and
baking the resist channel shrinking film over the patterned resist, to thereby reduce a width of the channel above the gap layer and pedestal.

26. The method of claim 25, further comprising:
removing the resist channel shrinking film; and
electroplating a second pole piece within the reduced-width channel of the patterned resist.

27. The method of claim 25, further comprising:
removing the resist channel shrinking film;
electroplating a second pole piece within the reduced-width channel of the patterned resist;
removing the patterned resist; and
milling the pedestal, using the second pole piece as a mask, to form a central notched pedestal having side walls with angled slopes.

28. The method of claim 25, wherein the act of forming the first pole piece pedestal comprises electroplating and wherein the act of forming the gap layer comprises electroplating a metal gap layer.

29. The method of claim 25, wherein the reduced-width channel is produced by an expansion of resist materials within the channel during the act of baking.

30. The method of claim 25, wherein the reduced-width channel is produced by a growth of materials within the channel during the act of baking.

* * * * *